J. E. CUMMINGS.
CULTIVATOR HOE.
APPLICATION FILED JAN. 18, 1921.

1,396,733.

Patented Nov. 15, 1921.

J. E. Cummings INVENTOR

UNITED STATES PATENT OFFICE.

JOHN E. CUMMINGS, OF WYOMING, RHODE ISLAND.

CULTIVATOR-HOE.

1,396,733.   Specification of Letters Patent.   Patented Nov. 15, 1921.

Application filed January 18, 1921. Serial No. 438,188.

*To all whom it may concern:*

Be it known that I, JOHN E. CUMMINGS, a citizen of the United States, residing at Wyoming, in the county of Washington and State of Rhode Island, have invented new and useful Improvements in Cultivator-Hoes, of which the following is a specification.

This invention contemplates the provision of a cultivator hoe having teeth which project an appreciable distance beyond the cutting edge of the blade of the hoe, so that they enter the soil and open up the way for the blade of the hoe to cut the weeds, roots, etc., and by moving the tool forward and rearwardly it operates to break up and cultivate the soil in a very effective manner with the least possible effort.

The nature and advantages of the invention will be better understood when the following detailed description is read in connection with the accompanying drawing, the invention residing in the combination, construction and arrangement of parts as claimed.

In the drawing forming part of this application like numerals of reference indicate the similar parts in the several views and wherein.

Figure 1:
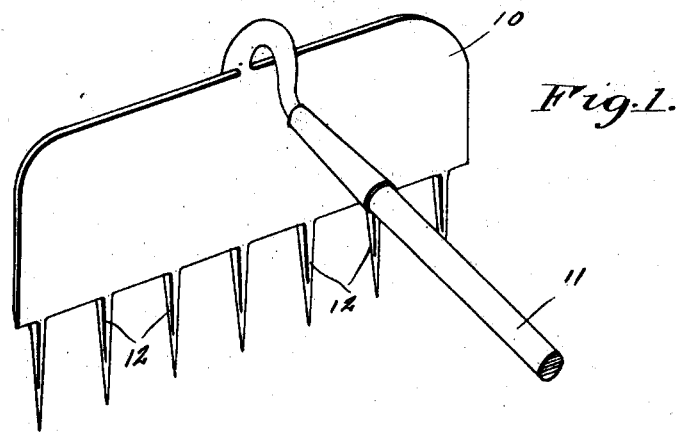
Figure 1 is a perspective view of the tool.
Figures 2, 3:
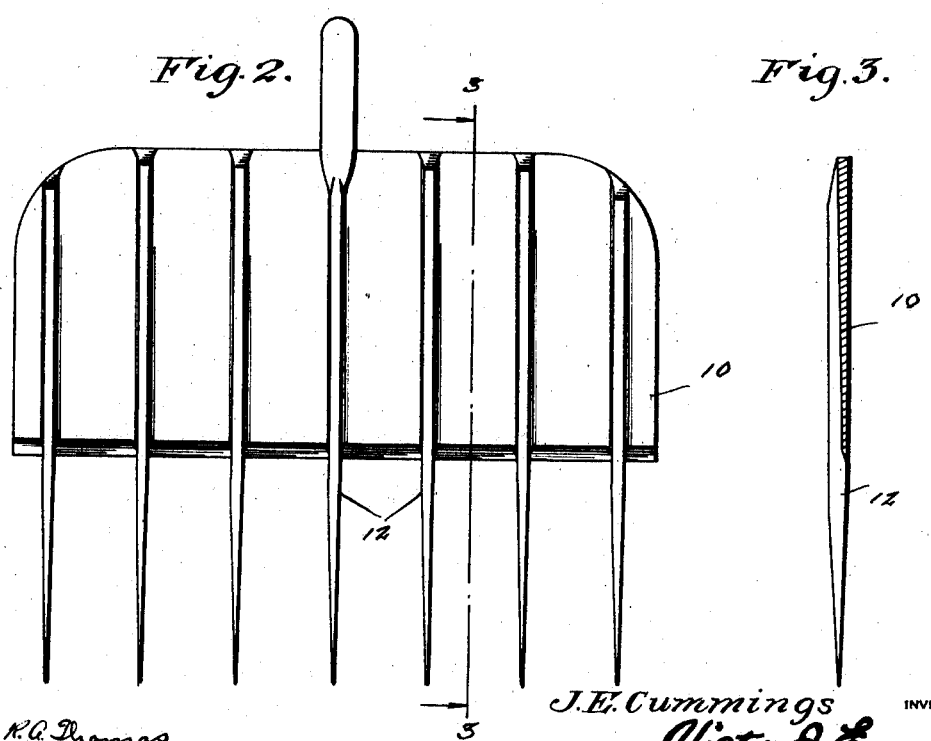
Fig. 2 is a rear elevation of the combined hoe and rake.
Fig. 3 is a sectional view taken on line 3—3 of Fig. 1.

Referring to the drawing in detail, 10 indicates the blade of the hoe which is of the usual well known construction, except that the blade is thicker at the top rather than at the lower edge thereof, giving the blade a slightly tapered formation in cross section as shown in Fig. 3. A handle 11 is connected with the blade 10 and arranged with respect thereto in the usual manner. Arranged at one side of the blade 10 and secured thereto in any suitable manner are a plurality of tines 12 which collectively constitute what I term a hoe. The tines may be spaced apart any appreciable distance, but all of the tines project beyond the cutting edge of the blade 10. In use of the tool the tines 12 enter the soil to provide an opening for the blade 10 which cuts the weeds and roots and by moving the cultivator hoe forwardly and rearwardly the soil can be easily and readily broken up and cultivated in a very effective manner and with a minimum amount of effort. The tool may be stamped from a single piece of material or otherwise suitably constructed. The blade extends a slight distance beyond the outermost tines to provide a cutting edge at each side of the blade.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:—

A tool of the class described comprising a tapering blade provided with a longitudinal cutting edge, a handle secured to the opposite edge of said blade, and a plurality of spaced tines secured to one side of said blade and extending beyond the cutting edge thereof.

In testimony whereof I affix my signature.

JOHN E. CUMMINGS.